Aug. 28, 1951     B. J. ALLEN     2,565,713
DIFFERENTIAL THERMOSTATIC DEVICE
Filed Sept. 4, 1948
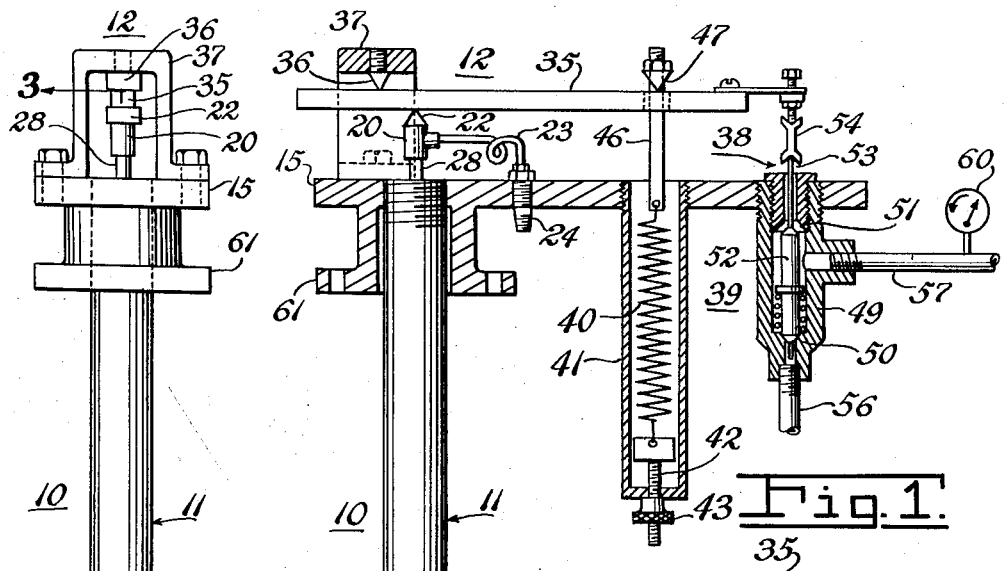
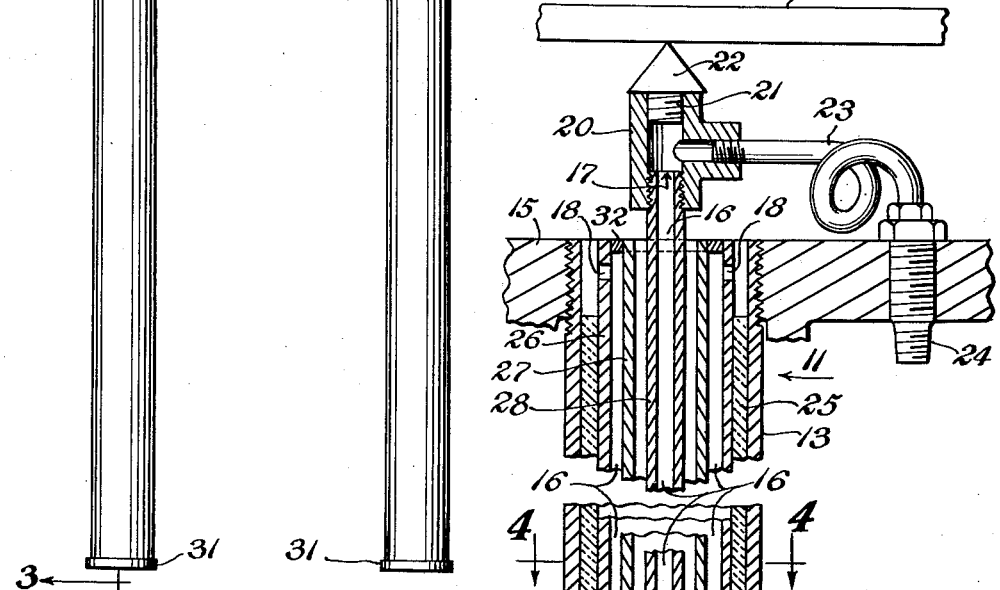
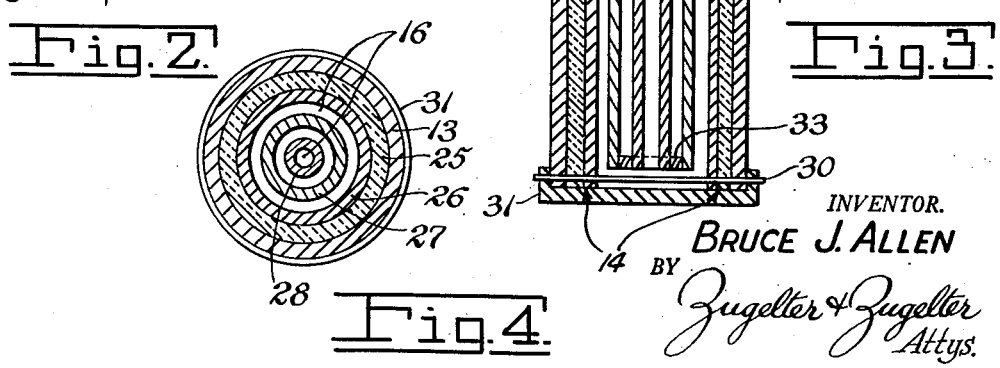
INVENTOR.
BRUCE J. ALLEN Patented Aug. 28, 1951

2,565,713

UNITED STATES PATENT OFFICE 2,565,713

DIFFERENTIAL THERMOSTATIC DEVICE

Bruce J. Allen, Cuyahoga Falls, Ohio, assignor, by mesne assignments, to Hagan Corporation, Pittsburgh, Pa., a corporation of Pennsylvania Application September 4, 1948, Serial No. 47,767

9 Claims. (Cl. 297—14)

This invention relates to thermostatic devices having temperature responsive elements of the differential expansion type, and more particularly to differential elements having an element which is thermo-expansively sensitive to temperature changes and a reference member that is substantially thermo-expansively insensitive to temperature changes.

Differential thermostatic devices in general use usually comprise a metallic tubular member having a relatively high temperature coefficient of expansion and a reference rod or member disposed within the tubular member. The reference rod is commonly made of quartz, carbon, or of metal having substantially low constant temperature coefficients of expansion compared with the coefficient of the thermo-expansively sensitive member. Since the sensitive member and the reference rod are usually of approximately equal lengths, changes in length of the tubular sensitive member are translated through the reference rod or member to an indicator or control device, as a measure of the temperature to which the thermostat is subjected. This measure of temperature is not accurate unless the length of the reference rod remains constant throughout the operating temperature range of the thermostat, or the changes in length thereof are uniform over said range, in which case correction can be made for the error thus introduced.

Quartz reference rods have limitations in that they are fragile and are not reliable at temperatures in the neighborhood of 800° or 900° F. and upward. Metal reference rods would be desirable if the metal had a zero temperature coefficient or a very low coefficient compared to the temperature sensitive or responsive member and provided that the coefficient remained unchanged throughout the operating temperature range of the thermostat. Metal has advantages over quartz and carbon because of its greater strength, however, metal reference rods as heretofore constructed have temperature coefficients that were either too high or too changeable to produce the degree of accuracy required of differential thermostats, in most industrial and scientific applications.

Differential thermostatic devices of the prior art have not been accurate at high temperatures because both the expansion member and the reference rod have been thermo-expansively sensitive to temperature.

An object of this invention is to provide a differential thermostat having a member which is thermo-expansively sensitive to temperature and a reference member which is substantially thermo-expansively insensitive to temperature changes.

Another object of the invention is to provide a differential thermostat having a reference member made of metal having a temperature coefficient of expansion that may be the same as or greater or less than the coefficient of the thermo-expansive member, but which is so constructed that it is substantially thermo-expansively insensitive to temperature changes.

A further object of the invention is to provide a differential thermostat having a reference member of metal which may have a temperature coefficient equal to or greater or less than that of the member which is thermo-expansively sensitive to temperature changes, that is so arranged and constructed that the reference member is rendered substantially thermo-expansively insensitive to temperature changes, thereby causing it to have a substantially constant effective length throughout the operating temperature range of the thermostat.

A still further object of the invention is to provide a differential thermostat having reference member comprising a plurality of tubular members, some of which have different temperature coefficients of expansion which are so arranged and asembled that the effective length of such reference members remains substantially constant with changes in temperature.

And a still further object of the invention is to provide a differential expansion thermostat having insulation between the member which is thermo-expansively sensitive to temperature and the reference member, and provided with means for supplying a coolant to the reference member only, thereby to dissipate to a substantial and effective extent, the heat which is transferred thereto through the temperature expansive member and the insulation.

These and other objects are attained by the thermostat embodying the invention, hereafter more fully described, and illustrated in the accompanying drawings, in which:

Figure 1 is a view in elevation partly in section of a differential thermostatic device embodying what now appears to be a preferred form of the invention;

Fig. 2 is a side view of the device shown in Fig. 1;

Fig. 3 is a fragmentary view in section taken on line 3—3 of Fig. 2, showing to enlarged scale details of construction of the differential thermostatic element together with means for supplying a coolant to the reference member; and Fig. 4 is a view in section taken on line 4—4 of Fig. 3.

Throughout the specification and drawings like reference characters indicate like parts.

The differential thermostatic device embodying the invention is indicated generally by the reference character 10 and comprises a differential thermostatic element 11 and means 12 actuated by the element 11 in accordance with changes in length thereof. The means 12 may be such as will indicate the particular temperature to which the differential element 11 is subjected. It may be designed to actuate control mechanism in accordance with temperature changes or the same may be adapted to both actuate indicating and control mechanism in accordance with the temperatue of element 11.

The differential thermostatic element 11 comprises a thermo-expansive element 13 which is sensitive to temperature change and a reference member 14 which is so arranged and constructed as to be substantially thermo-expansively insensitive to temperature change. Thus, as the temperature of element 13 changes from one value to another, it undergoes a change in length and this change in length is transmitted to the reference member 14 which in turn is operatively connected to actuate the means 12 in accordance with temperature changes of element 13, i. e. the difference between length changes of element 13 and reference member 14.

As shown, one end of the temperature sensitive element 13 is fixed or secured to a base or stationary member 15, its opposite end being free to move with changes in length thereof. One end of reference member 14 is fixed to the free end of temperature sensitive element 13, and the opposite or free end of member 14 moves in concordance with changes in length of element 13.

The temperature sensitive element 13 may be relatively long or elongated and, as is usual in differential thermostatic devices of this type, the reference member 14 may also be elongated and substantially the same length as the temperature sensitive element.

In a preferred form of construction the temperature sensitive element 13 is tubular and the reference member in the preferred construction is also tubular and is disposed within member 13.

The construction of the reference member is such that it is provided with a return pass 16 having an inlet 17 and an outlet 18 through which coolant may be circulated to carry away heat that may be transferred thereto through the temperature sensitive element 13, thereby to maintain the temperature of the reference element at a lower temperature than that of element 13. By maintaining the temperature of reference element substantially constant or at a lower temperature than that of element 13, it will be apparent that for any given temperature of element 13, the length of the reference member will be held substantially constant. Thus, if the reference member is made of metal having a coefficient of expansion which is the same as, equal to or less than the temperature coefficient of expansion of element 13, the overall or effective length of the reference member will remain substantially constant. Therefore, movement of the reference member will be substantially in accordance with length changes of the temperature sensitive element 13.

The coolant supplied to the pass 16 of the reference member may be either liquid or gas or compressed air. I have found that compressed air is a coolant suitable for the purpose. I have therefore provided at the free end of the reference member a T 20 having one end threaded to the free end of the reference member in communication with the pass 16 and the opposite end fitted with a plug 21 carrying a knife edge 22 which engages the mechanism of means 12 as will hereinafter be described. The lateral fitting of the T is connected to a fitting 24 in the base member 15 to which a source of supply of compressed air may be connected.

If desired, the space between the reference member and the temperature sensitive element 13 may be filled with a suitable insulating material 25 which fill serve to increase the temperature differential between the temperature sensitive element and the reference member 14.

In a preferred form of construction of the reference member I employ a plurality of tubular members 26—28 of different diameters so that they may be disposed one within another in coaxial relationship. These tubular members are preferably concentrically spaced and coaxial with the longitudinal axis of the tubular members comprising the assembly of the thermostatic element 11. As shown the tubular members comprising the reference member are of substantially equal length and so arranged that one end of the outer tubular member is free and the opposite end of the innermost tubular member is free. The tubular members are so connected together at the ends between the inner and outer free ends that changes in length of pairs of these tubular members is compensated by or neutralized by a corresponding opposite change in length of another tubular member.

As shown in Fig. 3, the lowermost end of the tubular member 26 is fixed to the free end of the thermosensitive element 13. The opposite or upper end of this tubular member is secured to the adjacent end of tubular member 27, whereas, the opposite or lowermost end of tubular member 27 is secured to the adjacent lowermost end of tubular member 28. Thus it will appear that a change in length of outer tubular reference member 26 will be offset by a change in length of tubular member 27, since changes in lengths of these two members will be in opposite directions. Any change in length of tubular member 28 will be in the same direction as the outer reference tubular member 26. If the outer and inner reference tubular members 26 and 28 are made of a metal having the same temperature coefficients of expansion, then it will be apparent that if the tubular reference member 27 is made of a metal having a temperature coefficient of expansion that is a multiple of the temperature coefficients of expansion of tubular members 26 and 28, that total changes in length of tubular members 26 and 28—these being additive, will be offset or neutralized by the changes in length of tubular element 27 which is subtracted with reference to changes in lengths of the outer and innermost members 26 and 28.

Thus if the temperature coefficient of expansion of reference members 26 and 28 are equal, and the temperature coefficient of expansion of reference member 27 is twice that of members 26 and 28, it follows that the effective length of the reference member will not change, even though each of the tubular reference members is heated throughout a wide range of temperature, assuming that the coefficient of each member remains constant throughout the range.

The outermost tubular reference member 26 may be secured or affixed to the free end of the temperature sensitive member 13 by means of rivets or a pin such as indicated at 30. The free end of the thermostatic element assembly may be closed by a cap 31, thus the cap 31 forms a part of the coolant pass 16.

The free end of reference member 26 may be secured to the adjacent end of tubular member 27 in any suitable manner as by crimping the ends together, or by brazing them to a metal ring 32 which also acts as a spacer. Likewise, the opposite end of member 27 may be joined to the adjacent end of reference member 28 in a similar fashion. As shown, however, these ends are secured together by means of a ring 33 to which the ends of members 27 and 28 are secured by brazing, welding, or soldering. In a reference rod assembly such as shown in Fig. 3, the pass 16 is formed by the inner space of reference member 28 and the space between reference members 26 and 27, the outlets 18 being formed in the upper end of the outer member 26.

When the thermostatic element 11 is subjected to temperature changes the sensitive element 13 will expand or contract, depending on whether the temperature is increased or decreased, thereby undergoing a change in length. Since the one end of this element is fixed and the other is free to move, the reference member will move longitudinally of the sensitive element in correspondence with the total change in length of element 13. This movement is translated by the reference element through its knife edge 22 to means 12.

Means 12 may comprise a simple indicator of movement which may be graduated in terms of temperature or which may comprise not only an indicator but also a control element or device as well. As shown, means 12 comprises a beam 35, which rests near one end of knife edge 22. A fulcrum knife edge 36 bears on the opposite edge of the beam at a point relatively close to the point of contact of knife edge 22 with the beam.

Fulcrum 36 is carried by a support 37 secured to base 15. Beam 35 is disposed to actuate an indicator 38 at its free end such as an escapement valve 39. A spring 40 may be employed to urge the beam 35 into contact with its knife edges 22 and 36. This spring is disposed within a tubular support 41, one end of which is secured to the base 15 and the opposite end of which receives a threaded adjusting screw 42 upon which is mounted an adjusting nut 43. One end of the spring is secured to the adjusting screw 42 and the opposite end is secured to a link 45 which passes through beam 35 into engagement with a knife edge 47. The spring 40 is in tension so that it urges knife edge 47 against the upper side of the beam.

The escapement valve 39 includes a body 49 having a seated inlet port 50 and a seated outlet port 51 and a valve 52 having a stem 53 that is operatively connected to beam 35 through a link or strut 54. Valve 52 is adapted to engage one or the other of seats 50 and 51 as it moves between them to provide relative throttling of the inlet end exhaust ports so that pressure fluid transmitted from a supply pipe 56 will be delivered to a sending line 57 connected to the interior of the valve body between its inlet and exhaust ports, and will have a variable pressure developed therein which varies from a maximum to a minimum with infinitesimal intermediate variation, depending on the position of the beam 35. The pressure in line 57 may be measured by a gauge 60, which may be calibrated in terms of temperature. Thus the device shown may be used as an indicating thermostat or temperature measuring device or may also be employed as a regulating device, in which case the sending line 57 is connected to apparatus to be actuated in accordance with the temperature to which the element 11 is exposed. That the device shown in the drawing may be utilized for temperature indication as well as for regulation is well known to those skilled in this art and need not be illustrated in detail. The device may be secured to a pipe line or duct carrying hot gases, fluids or the like, by securing a flange 61 of base 15 to an appropriate fitting which provides an opening through which the thermostatic element 11 may be inserted so as to be in contact with the medium whose temperature is to be measured or regulated.

Having thus described the invention it will be apparent to those skilled in this art that various modifications and changes may be made without departing from the spirit or the scope of the invention as indicated by the appended claims.

What is claimed is:

1. A differential thermostat comprising an actuated means, a rigid support, an elongated tubular temperature-sensitive member having one end secured to said rigid support and the other end free to move, a reference member within said temperature-sensitive tubular member, said reference member being secured at one end to the free end of said temperature-sensitive member and the other end operatively connected to said actuated means, the reference member comprising a plurality of tubular members of substantially the same length as said temperature-sensitive member connected to form a plurality of continuous parallel return-bend passes disposed between said secured and free ends of the temperature-sensitive member to provide alternate oppositely expanding sections, so arranged that the length thereof as measured between its free and secured ends remains substantially constant and substantially thermo-expansively insensitive to temperature changes, whereby the actuated means is actuated by and in accordance with changes in length of the temperature-sensitive member, and means for passing a coolant under pressure through said return-bend passes.

2. A thermostat according to claim 1, characterized by the fact that said reference member is spaced from the tubular temperature-sensitive member substantially throughout its length, and that insulating material is disposed in the space between said reference member and said temperature-sensitive member substantially throughout the length of said space.

3. A differential expansion thermostat comprising an element that is thermo-expansively sensitive to temperature changes and which is fixed in position at one end and free to move at the other with changes in length thereof, and a reference member substantially coextensive with and parallel to said temperature-sensitive element, said reference member being fixed at one end to the free end of said temperature-sensitive element and free to move at the other in correspondence with the changes in length of said temperature-sensitive element, whereby the free end of said reference member moves in correspondence with total change in length of said temperature-sensitive element effected by changes in temperature thereof, movement of said reference member being capable of actuating devices in accordance with the temperature of said sensitive element, the temperature-sensitive element comprising an longated tubular metallic member, and said reference member comprising a plurality of elongated members, within and substantially co-extensive with the longitudinal axis of said temperature-sensitive member, said reference members being joined together at alternate opposite ends so that one end of one said members is free and the opposite end of a member remote therefrom is free; one of said free ends being secured to the free end of said temperature-sensitive tubular member and the other free end being disposed to actuate mechanism in response to total length change of said temperature-sensitive member, alternate ones of said reference members having substantially equal temperature coefficients of expansion, and an intervening reference member thereof having a coefficient of expansion that is substantially a multiple of the coefficient of said first-mentioned reference members, whereby changes in length of the reference members having substantially equal coefficients are substantially neutralized by changes in length of the member having the multiple coefficient.

4. A thermostatic device according to claim 3 characterized by the fact that the elongated members of said reference member are spaced tubular members of substantially equal length disposed one within the other.

5. A thermostatic device according to claim 3 characterized by the fact that the elongated members of said reference member are concentric spaced tubular members of approximately equal length, the spaces between said tubular members which communicate with the innermost tubular member forming a return pass, an inlet and an outlet for said pass, and means for connecting said inlet to a source of supply of coolant, said coolant dissipating heat transmitted thereto through said sensitive and reference members, and insulating material in the space between said sensitive tubular member and the outermost reference tubular member.

6. A differential thermostat comprising an actuated means, a rigid support, an elongated tubular temperature-sensitive member having one end secured to said rigid support and the other end free to move, a reference member within said tubular member, said reference member being secured at one end to the free end of said tubular member and the other end operatively connected to said actuated means, the reference member comprising a plurality of tubular members of substantially the same length as said temperature-sensistive member connected to form a plurality of continuous, concentric, parallel return-bend passes extending between the secured and free ends thereof and to provide oppositely expanding sections so arranged that the length thereof as measured between its free and secured ends remains substantially constant and substantially thermo-expansively insensitive to temperature changes, whereby the actuated means is actuated by and in accordance with changes in length of the temperature-sensitive member.

7. A differential thermostat comprising an actuated means, a rigid support, an elongated tubular temperature-sensitive member having one end secured to said rigid support and the other end free to move, a reference member within said temperature-sensitive tubular member, said reference member being secured at one end to the free end of said temperature-sensitive member and the other end operatively connected to said actuated means, the reference member comprising a plurality of tubular members disposed one within the other in spaced co-axial relation lengthwise thereof, the ends of each tubular member being joined to alternate adjacent ends of the next adjacent tubular member in progression radially of the reference member, so that one end of the outer tubular member and the opposite end of the inner tubular member are free, the free end of one of said tubular members being rigidly connected to the free end of said temperature-sensitive tubular member, and the free end of said other tubular member is disposed to move in correspondence with changes in length of the temperature-sensitive tubular member, the spaces between alternate tubular members of said reference member forming a return pass, and means for passing a coolant through said pass to dissipate heat transferred through the temperature-sensitive tubular member to the tubular members of said reference member.

8. A differential thermostat comprising an actuated means, a rigid support, an elongated tubular temperature-sensitive member having one end secured to said rigid support and the other end free to move, a reference member within said temperature-sensitive tubular member, said reference member being secured at one end to the free end of said temperature-sensitive member and the other end operatively connected to said actuated means, the reference member comprising a plurality of tubular members disposed one within the other in spaced co-axial relation, the end of one tubular member being joined to the adjacent end of the next adjacent tubular member in progression radially of the reference member, so that one end of the outer tubular member and the opposite end of the inner tubular member are free, the free end of one of said tubular members being rigidly connected to the free end of said temperature-sensitive tubular member, and the free end of said other reference tubular member being disposed to move in correspondence with changes in length of the temperature-sensitive tubular member, the metal of said outer and inner reference tubular members having substantially equal coefficients of expansion, and an intervening reference tubular member being of metal having a temperature coefficient of expansion that is substantially a multiple of said inner and outer tubular members, thereby to maintain the overall length of said reference member substantially constant though the temperature thereof changes.

9. A differential thermostat comprising an actuated means, a rigid support, an elongated tubular temperature-sensitive member having one end secured to said rigid support and the other end free to move, a reference member within said temperature-sensitive tubular member, said reference member being secured at one end to the free end of said temperature-sensitive member and the other end operatively connected to said actuated means, the reference member comprising an outer metallic tubular member, an inner metallic tubular member and an intervening metallic tubular member, said inner and intervening members being concentric and coaxial with said outer reference tubular member, one end of said intervening tubular member being joined to one end of said outer reference tubular member and the opposite end of said intervening member being joined to the adjacent end of said inner reference tubular member, the opposite ends of said inner and outer reference tubular members being free, the free end of said outer reference member being secured to the free end of said temperature-sensitive tubular member and the free end of said inner reference member being disposed to move in concordance with changes in length of said temperature-sensitive tubular member, the temperature coefficient of expansion of the metal of said inner and outer reference tubular members being substantially equal to the coefficient of the metal of the temperature-sensitive member, and said intervening reference member being of metal having a temperature coefficient of expansion that is substantially a multiple of the coefficient of said inner and outer reference tubular members.

BRUCE J. ALLEN.

REFERENCES CITED

The following references are of record in the file of this patent:

UNITED STATES PATENTS

| Number | Name | Date |
| --- | --- | --- |
| 265,633 | Puffer | Oct. 10, 1882 |
| 509,153 | Fisher | Nov. 21, 1893 |
| 809,941 | Glockler | Jan. 16, 1906 |
| 1,726,068 | Hoeschen | Aug. 27, 1929 |
| 2,332,212 | Fillo | Oct. 19, 1943 |